(12) United States Patent
Sawchuk et al.

(10) Patent No.: US 9,605,695 B2
(45) Date of Patent: Mar. 28, 2017

(54) FLOW CONDITIONER AND METHOD OF DESIGNING SAME

(71) Applicant: Canada Pipeline Accessories, Co. Ltd., Calgary (CA)

(72) Inventors: Daniel Sawchuk, Chestermere (CA); Reginald Selirio, Calgary (CA)

(73) Assignee: Canada Pipeline Accessories, Co. Ltd. (CA)

( * ) Notice: Subject to any disclaimer, the term of this patent is extended or adjusted under 35 U.S.C. 154(b) by 0 days.

(21) Appl. No.: 14/786,701

(22) PCT Filed: May 1, 2014

(86) PCT No.: PCT/CA2014/050416
§ 371 (c)(1),
(2) Date: Oct. 23, 2015

(87) PCT Pub. No.: WO2014/186883
PCT Pub. Date: Nov. 27, 2014

(65) Prior Publication Data
US 2016/0097411 A1    Apr. 7, 2016

Related U.S. Application Data

(60) Provisional application No. 61/825,559, filed on May 21, 2013.

(51) Int. Cl.
  *F15D 1/02* (2006.01)
  *F16L 55/027* (2006.01)
(52) U.S. Cl.
  CPC ........ *F15D 1/025* (2013.01); *F16L 55/02709* (2013.01)

(58) Field of Classification Search
  USPC ...................................................... 138/39, 44
  See application file for complete search history.

(56) References Cited

U.S. PATENT DOCUMENTS 2,929,248 A     3/1960  Sprenkle
3,545,492 A    12/1970  Scheid
(Continued)

FOREIGN PATENT DOCUMENTS

CA     2171828     3/1995
CA     2228928     8/1995
(Continued)

OTHER PUBLICATIONS

International Preliminary Report on Patentability dated Aug. 2015.
(Continued)

*Primary Examiner* — James Hook
(74) *Attorney, Agent, or Firm* — Cahn & Samuels, LLP (57) ABSTRACT

A flow conditioner includes a single disk having a first side and a second side; an outer ring comprising a plurality of holes, wherein the holes extend from the outer ring to the first side of the disk; at least one inner ring recessed from the outer ring, the at least one inner ring comprising a plurality of holes, wherein the holes extend from the at least one inner ring to the first side of the disk; and a central hole recessed from the at least one inner ring. The plurality of holes in the outer ring and in the at least one inner ring provide fluid passages of unequal length from a first side of the flow conditioner to a second side of the flow conditioner.

20 Claims, 10 Drawing Sheets

(56) References Cited

U.S. PATENT DOCUMENTS

| | | | |
|---|---|---|---|
| 3,838,598 A * | 10/1974 | Tompkins | G01F 1/42 73/861.52 |
| 3,840,051 A | 10/1974 | Akashi | |
| 4,715,395 A | 12/1987 | Mainelli et al. | |
| 5,058,426 A | 10/1991 | Kobayashi | |
| 5,327,941 A | 7/1994 | Bitsakis et al. | |
| 5,341,848 A | 8/1994 | Laws | |
| 5,495,872 A | 3/1996 | Gallagher et al. | |
| 5,529,093 A | 6/1996 | Gallagher | |
| 5,606,297 A | 2/1997 | Phillips | |
| 5,762,107 A | 6/1998 | Laws | |
| 5,959,216 A | 9/1999 | Hocquet et al. | |
| 5,992,465 A | 11/1999 | Jansen | |
| 6,029,912 A | 2/2000 | Woolley | |
| 6,145,544 A | 11/2000 | Dutertre | |
| 6,651,514 B2 | 11/2003 | Zanker | |
| 6,807,986 B2 | 10/2004 | Boger | |
| 6,851,322 B2 | 2/2005 | Gallagher | |
| 6,880,579 B2 | 4/2005 | Boger | |
| 7,073,534 B2 * | 7/2006 | Sawchuk | F15D 1/02 138/39 |
| 7,089,963 B2 | 8/2006 | Meheen | |
| 7,303,048 B2 | 12/2007 | Gallagher et al. | |
| 7,464,611 B2 | 12/2008 | Matter et al. | |
| 7,845,688 B2 | 12/2010 | Gallagher et al. | |
| 7,858,910 B2 | 12/2010 | Williams | |
| 8,132,961 B1 | 3/2012 | England et al. | |
| D697,581 S | 1/2014 | Sawchuk et al. | |
| D701,939 S | 4/2014 | Sawchuk et al. | |
| 8,763,644 B2 * | 7/2014 | Tsai | F15D 1/025 138/39 |
| D713,492 S | 9/2014 | Sawchuk et al. | |
| D721,417 S | 1/2015 | Sawchuk et al. | |
| 2004/0055816 A1 | 3/2004 | Gallagher et al. | |
| 2005/0178455 A1 | 8/2005 | Cancade et al. | |
| 2005/0205147 A1 | 9/2005 | Sawchuk et al. | |
| 2006/0096650 A1 | 5/2006 | Sawchuk et al. | |
| 2008/0037366 A1 | 2/2008 | Smith | |
| 2008/0246277 A1 | 10/2008 | Gallagher et al. | |
| 2009/0277974 A1 * | 11/2009 | Citrawireja | B05B 15/001 239/203 |
| 2010/0024910 A1 * | 2/2010 | Nakamori | B67C 3/2608 138/39 |
| 2011/0076628 A1 * | 3/2011 | Miura | F23R 3/10 431/12 |
| 2011/0174407 A1 | 7/2011 | Lundberg et al. | |
| 2011/0174408 A1 | 7/2011 | Lundberg et al. | |
| 2012/0247223 A1 | 10/2012 | Sawchuk et al. | |
| 2014/0110094 A1 * | 4/2014 | Pagan Duran | F28F 5/00 165/172 |
| 2014/0196535 A1 | 7/2014 | Sawchuk et al. | |
| 2015/0083262 A1 * | 3/2015 | Van Buskirk | F15D 1/025 138/40 |
| 2015/0240843 A1 | 8/2015 | Sawchuk et al. | |
| 2016/0061372 A1 * | 3/2016 | Sawchuk | F15D 1/025 138/39 |

FOREIGN PATENT DOCUMENTS

| | | |
|---|---|---|
| CA | 2787659 | 7/2011 |
| DE | 102010062892 A1 | 6/2012 |
| EP | 0342612 A1 | 11/1989 |
| FR | 2233914 A5 | 1/1975 |
| GB | 1469648 | 4/1977 |
| JP | 55159831 A | 12/1980 |
| WO | 2014040191 A1 | 3/2014 |
| WO | 2014110673 A1 | 7/2014 |
| WO | 2014186883 A1 | 11/2014 |

OTHER PUBLICATIONS

Various Authors, 2003 Proceedings, 38th Annual American School of Gas Measurement Technology, Sep. 2003, American School of Gas Measurement Technology, Total pp. 390.

Gallagher, J., Flow Conditioning—Why, What, When and Where, http://www.cbeng.com/resources/whitepaper/FlowConditioning.pdf, Copyright 2004, printed on May 23, 2016.

English Abstract of JP 55159831 dated Dec. 12, 1980.

English Abstract of EP0342612 (A1).

English Abstract of DE102010062892 (A1).

English Abstract of FR 2233914. Jan. 10, 1975.

* cited by examiner

FLOW CONDITIONER AND METHOD OF DESIGNING SAME

This is a U.S. national stage application of PCT international application PCT/CA2014/050416 filed on 1 May 2014 and claims priority to U.S. Ser. No. 61/825,559 filed on 21 May 2013 in the U.S. Patent and Trademark Office, the entireties of which are incorporated herein by reference.

I. TECHNICAL FIELD

The present invention relates to fluid flow measurement components used in oil and gas pipelines. More particularly, the present invention relates to a flow conditioner and to methods of designing flow conditioners.

II. BACKGROUND OF THE INVENTION

Pipelines are used to transport fluids in various industries, including chemical, oil and gas, and manufacturing. These industries use processes that require fluid flow rates to be accurately measured. These measurements are performed at locations known as meter stations using a variety of different meter types. These meters function in different ways, they can use: differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity flow profile.

To achieve the most accurate measurements, the flow profile of the fluid entering a metering device must be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and other assemblies that change the flow profile into an asymmetric, unstable, and distorted configuration. This makes it very difficult to measure the fluid flow rate in a consistently accurate and repeatable manner. Under these conditions, flow conditioners are needed to correct the flow profile of the fluid such that it forms a fully developed flow profile, which allows accurate, repeatable measurements to be made.

Several types of flow conditioners exist, including straightening vanes, tube bundles, and perforated plates. These flow conditioners are placed within the pipe upstream of the flow meter. A typical perforated plate flow conditioner consists of a perforated metal plate that is arranged within a pipe orthogonal to the fluid flow, i.e., across the entire cross section of pipe. The perforations or holes in the flow conditioner cause the fluid flow to be redistributed such that it forms a fully developed flow profile. The placement of a flow conditioner upstream of the flow meter ensures that the flow is fully developed before it reaches the meter. This allows the meter to perform significantly more accurate and repeatable fluid flow measurements.

However, there remains a need to design flow conditioners based on the fluid dynamics of a particular pipe installation.

III. SUMMARY OF THE INVENTION

The invention provides in a first embodiment a flow conditioner characterized by a single disk having a first side and a second side; a central hole that opens on a first side of the disk; at least one inner ring comprising a concentric ring of a plurality of holes, wherein the holes define fluid passages from the at least one inner ring to the first side of said disk; and an outer ring comprising a concentric ring of a plurality of holes, wherein the holes define fluid passages from the outer ring to the first side of said disk. A diameter of the central hole is greater than the diameters of the plurality of holes of the at least one inner ring, and the diameters of the plurality of holes of the at least one inner ring are greater than the diameters of the plurality of holes of the outer ring. The central hole defines a fluid passage having a length which is less than the length of the fluid passages of the plurality of holes of the at least one inner ring, and the length of the fluid passages of the plurality of holes of the at least one inner ring is less than the length of the fluid passages of the outer ring.

The invention provides in a second embodiment to any of the previous embodiments a flow conditioner characterized in that the central hole is recessed from said at least one inner ring.

The invention provides in a third embodiment to any of the previous embodiments a flow conditioner characterized in that the at least one inner ring comprises two or more stepped, recessed concentric rings, each concentric ring comprising a plurality of holes.

The invention provides in a fourth embodiment to any of the previous embodiments a flow conditioner further characterized by a flange connection on the first side of said disk.

The invention provides in a fifth embodiment to any of the previous embodiments a flow conditioner further characterized by a flange connection on the second side of said disk.

The invention provides a method of designing a flow conditioner in a first method embodiment characterized by determining fluid dynamics of a pipe into which a flow conditioner according to any or the previous embodiments is to be installed; and calculating a configuration for a plurality of holes of the flow conditioner according to any of the previous embodiments.

The invention provides a method of designing a flow conditioner in a second method embodiment to any of the previous method embodiments characterized in that a length of a fluid passage defined by each hole (x) is a function of the radius (r) from a center of the pipe.

The invention provides a method of designing a flow conditioner in a third method embodiment to any of the previous method embodiments characterized in that a length of a fluid passage is calculated by the following formula: $D = C * \tan^{-1}(VT/Vx)$ wherein D is the depth of the flow conditioner holes, VT is the tangential velocity of a fluid in the pipe, Vx is the axial velocity of the fluid in the pipe, and C is a coefficient that corrects for fluid viscosity, density, wall roughness and the swirl reduction factor.

The invention provides a pipe assembly for flow measurement characterized by a fluid flow pipe; a flow conditioner according to any of the previous embodiments disposed within the fluid flow pipe in an orientation substantially perpendicular to an axis of the fluid flow pipe.

The invention further provides a fluid flow measurement system including a fluid flow pipe; a flow conditioner according to any of the previous embodiments disposed within the fluid flow pipe in an orientation substantially perpendicular to an axis of the fluid flow pipe; and a flow meter.

As used herein "substantially", "relatively", "generally", "about", and "approximately" are relative modifiers intended to indicate permissible variation from the characteristic so modified. They are not intended to be limited to the absolute value or characteristic, which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

V. DETAILED DESCRIPTION OF THE INVENTION

According to the present invention, a flow conditioner comprises a single disk having a plurality of perforations or holes that are machined out of the same material as the disk itself. A configuration of the perforations or holes may be selected depending on the computational fluid dynamics of a pipe into which a flow conditioner is to be installed.

In specific embodiments, the configuration of perforations or holes may be in the form of at least one, for example a plurality of, concentric rings of holes. Concentric rings of holes may be in a stepped or recessed configuration, thereby defining fluid passages of unequal length from one side of the flow conditioner to an opposite side of the flow conditioner. Stepped or recessed concentric rings of holes may occur on an upstream side, a downstream side, or on both sides of the flow conditioner. In embodiments, the shape of the holes may be circular. However, different and/or multiple hole patterns or shapes may be used as long as the holes are radially symmetric.

An optional flange connection may surround the flow conditioner or may be flush with a first end or second end (e.g., an upstream end/face or a downstream end/face) of the flow conditioner. In a specific embodiment, a flange connection may be integral with a concentric ring of a plurality of holes.

According to the present invention, a flow conditioner may comprise a single disk having a first side and a second side. A central hole opens on a first side of the disk.

At least one inner ring comprises a concentric ring of a plurality of holes, wherein the holes define fluid passages from the at least one inner ring to the first side of the disk. An outer ring comprises concentric ring of a plurality of holes, wherein the holes define fluid passages from the outer ring to the first side of the disk.

A diameter of the central hole may be greater than the diameters of the plurality of holes of the at least one inner ring, and the diameters of the plurality of holes of the at least one inner ring may be greater than the diameters of the plurality of holes of the outer ring.

The central hole defines a fluid passage having a length which may be less than the length of the fluid passages of the plurality of holes of the at least one inner ring, and the length of the fluid passages of the plurality of holes of the at least one inner ring may be less than the length of the fluid passages of the outer ring.

Figure 1:
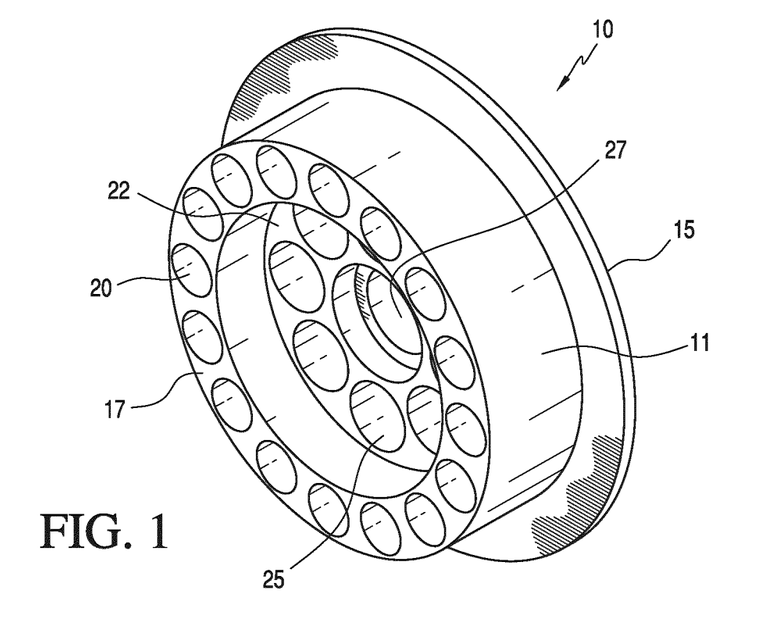
FIG. 1 illustrates a perspective view of a second side of a flow conditioner according to a first embodiment of the present invention.

According to a first embodiment, FIG. 1 illustrates a perspective view of a second side of a flow conditioner 10 comprising a disk 11 having a first side and a second side. Flow conditioner 10 comprises 1) a flange 15 on the first side of the disk; 2) an outer ring 17 comprising a concentric ring of a plurality of holes 20 defining fluid passages from the outer ring to the first side of the disk; 3) at least one inner ring 22 recessed or stepped from the outer ring 17 and comprising a concentric ring of a plurality of holes 25 defining fluid passages from the at least one inner ring 22 to the first side of the disk; and 4) a central hole 27 recessed or stepped from the inner ring of holes 25 and opening on the first side of the disk.

Figure 2:
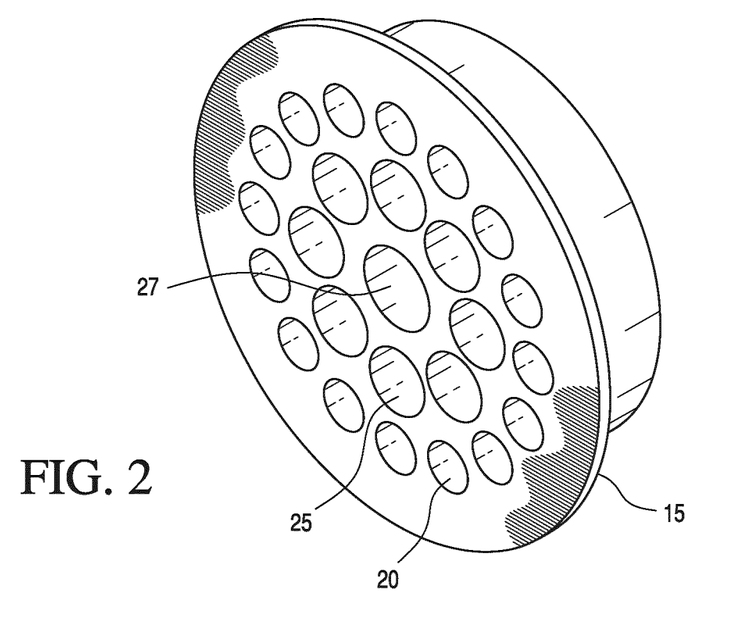
FIG. 2 illustrates a perspective view of a first side of the flow conditioner of FIG. 1.

The plurality of holes 20 in the outer ring 17 and the plurality of holes 25 in the at least one inner ring 22 provide fluid passages of unequal length from a second side of the flow conditioner to a first side of the flow conditioner and vice versa. FIG. 2 illustrates a perspective view of the first side of the flow conditioner of FIG. 1.

As illustrated, the outer ring and at least one inner ring may comprise concentric rings of circular holes. In specific embodiments, the at least one inner ring may comprise a plurality or series of stepped, recessed concentric rings, each ring comprising a plurality of holes.

Figure 3:
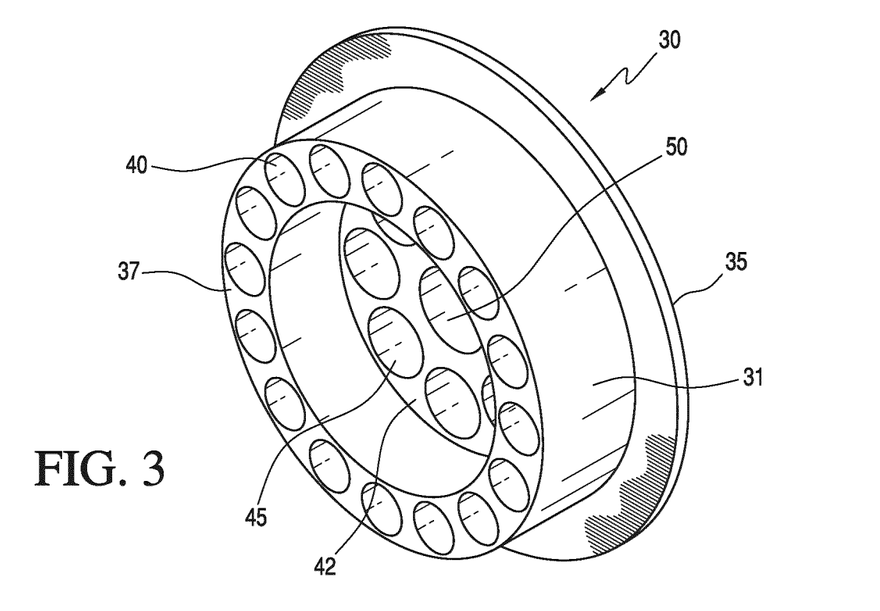
FIG. 3 illustrates a perspective view of a second side of a flow conditioner according to a second embodiment of the present invention.
Figure 4:
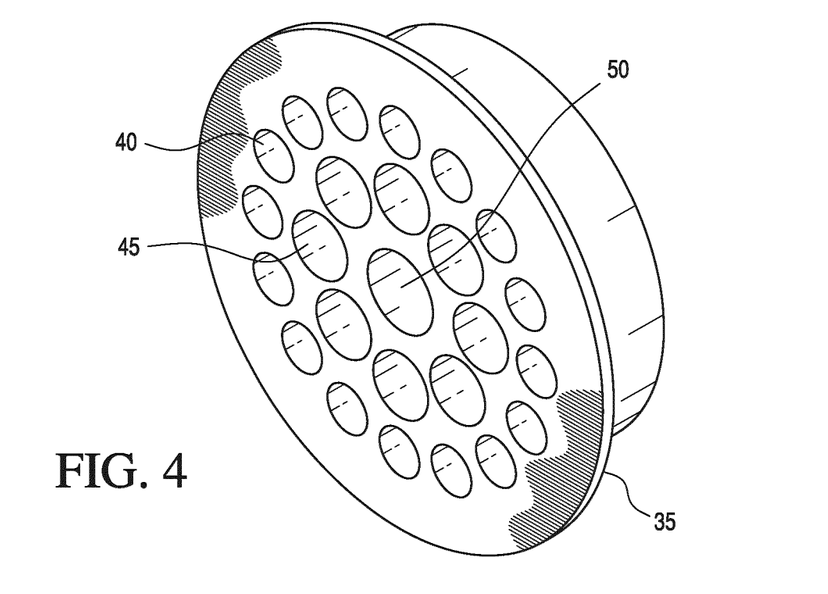
FIG. 4 illustrates a perspective view of a first side of the flow conditioner of FIG. 3.

According to a second embodiment, FIG. 3 illustrates a perspective view of a second side of a flow conditioner 30 comprising a disk 31 having a first side and a second side. Flow conditioner 30 comprises 1) a flange 35 on a first side of the disk; 2) an outer ring 37 comprising a concentric ring of plurality of holes 40 defining fluid passages from the outer ring to the first side of the disk; 3) an inner ring 42 recessed or stepped from the outer ring 37 and comprising a concentric ring of a plurality of holes 45 defining fluid passages from the inner ring 42 to the first side of the disk; and 4) a central hole 50 within the inner ring 42 opening on the first side of the disk. FIG. 4 illustrates a perspective view of the first side of the flow conditioner of FIG. 3.

Figure 5:
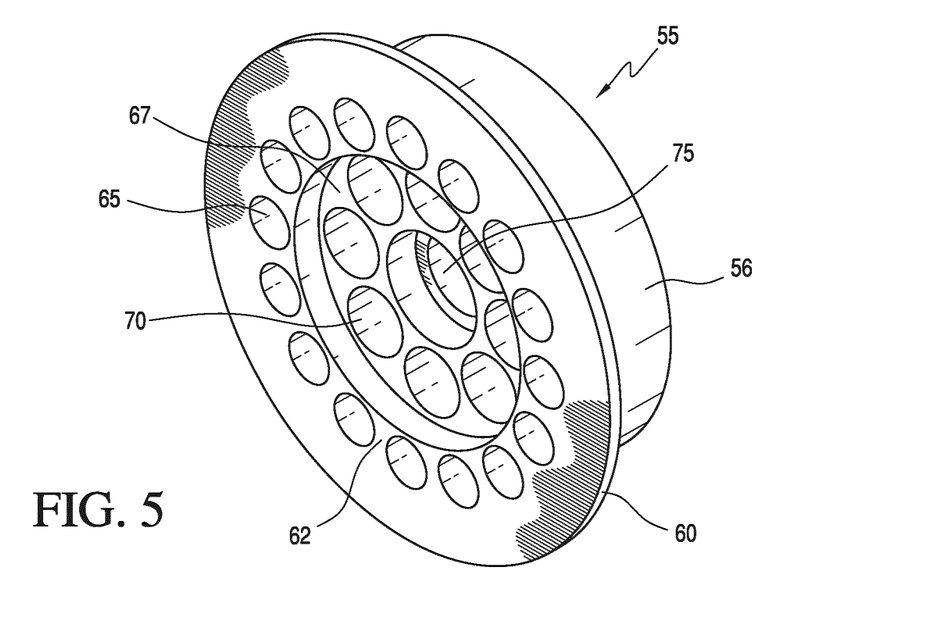
FIG. 5 illustrates a perspective view of a first side of a flow conditioner according to a third embodiment of the present invention.

According to a third embodiment, FIG. 5 illustrates a perspective view of a first side of a flow conditioner 55 comprising a disk 56 having a first side and a second side. Flow conditioner 55 comprises 1) a flange 60 on a first side of the disk; 2) an outer ring 62 comprising a concentric ring of a plurality of holes 65 on the first side of the disk, wherein the outer holes 65 define fluid passages from the outer ring to the second side of the disk; 3) an inner ring 67 comprising a concentric ring of a plurality of holes 70 recessed or stepped from the outer ring 62, wherein the inner holes 70 define fluid passages from the inner ring to the second side of the disk; and 4) a central hole 75 recessed or stepped from the inner ring 67 and opening on the second side of the disk.

Figure 5A:
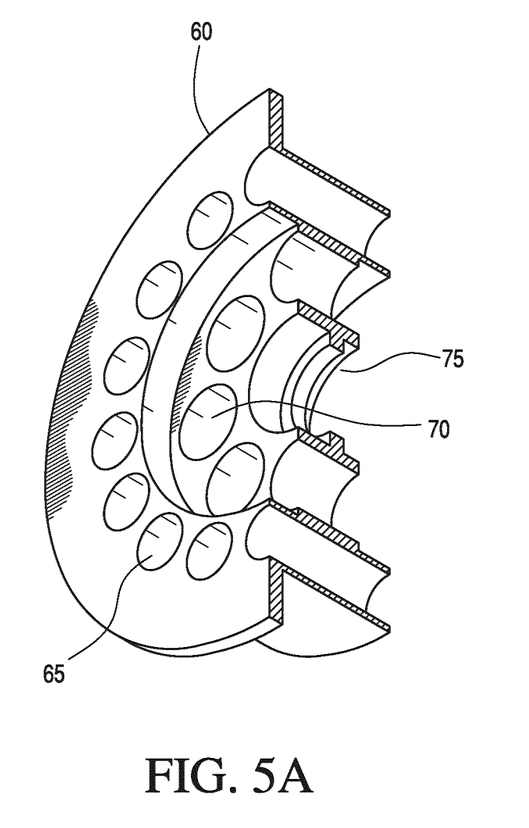
FIG. 5a is a cut-away view of a flow conditioner as in FIG. 5, but having an outer ring and an inner ring on both sides of the flow conditioner.

FIG. 5a is a cut-away view of a flow conditioner as in FIG. 5, but having an outer ring and an inner ring on both sides of the flow conditioner. The plurality of holes 65 in the outer ring and the plurality of holes 70 in the inner ring provide fluid passages of unequal length from a first side of the flow conditioner through to a second side of the flow conditioner.

Figure 6:
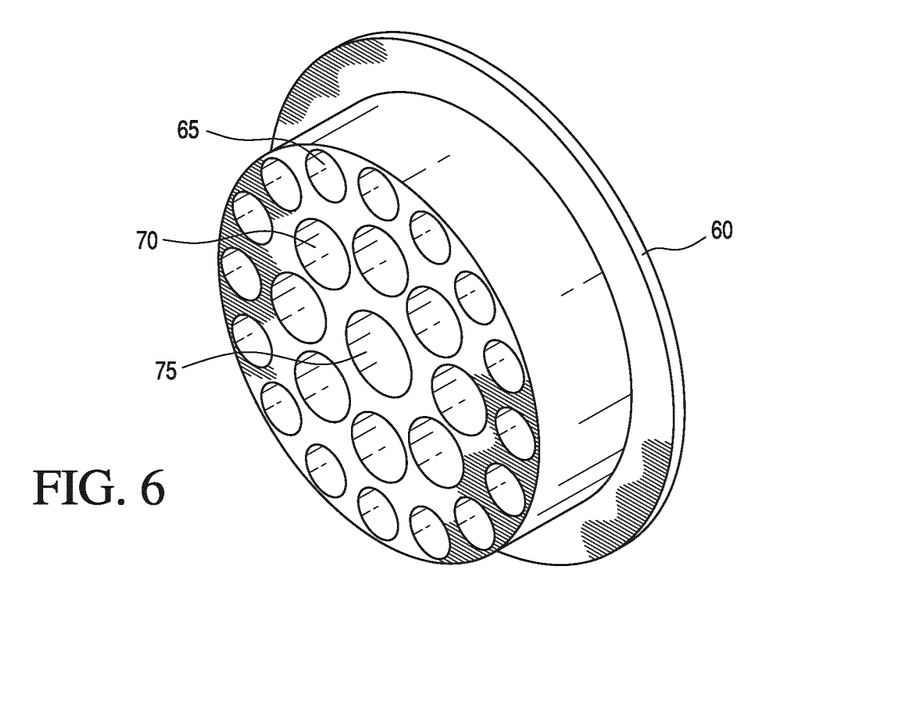
FIG. 6 illustrates a perspective view of a second side of the flow conditioner of FIG. 5.

FIG. 6 illustrates a perspective view of a second side of the flow conditioner of FIG. 5.

Figure 7:
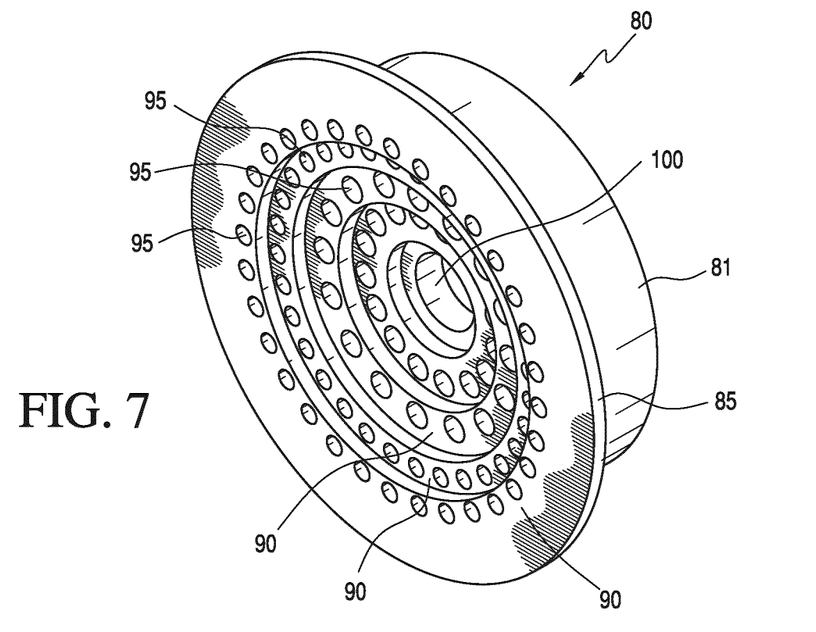
FIG. 7 illustrates a perspective view of a first side of a flow conditioner according to a fourth embodiment of the present invention.
Figure 8:
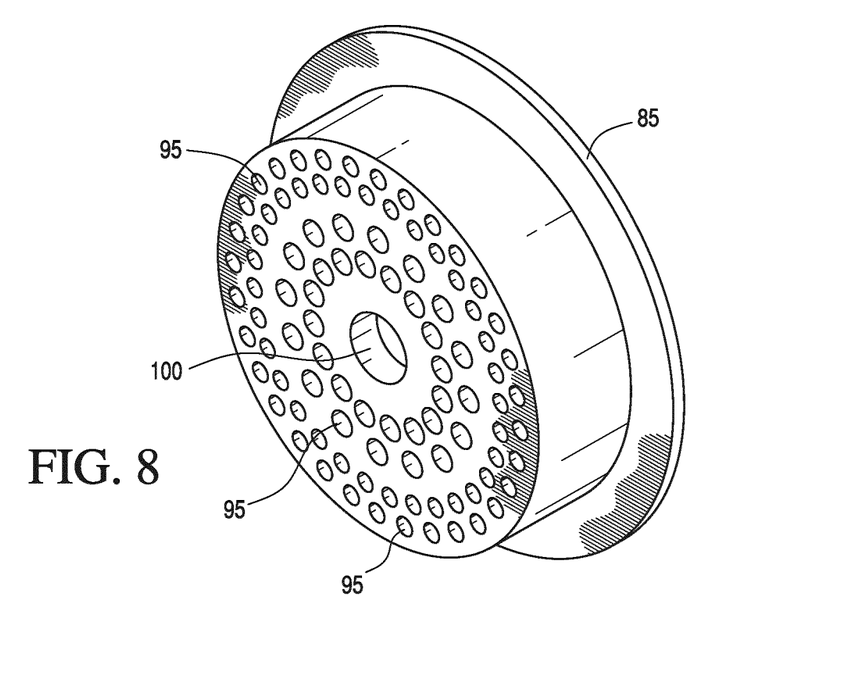
FIG. 8 illustrates a perspective view of a second side of the flow conditioner of FIG. 7.

According to a fourth embodiment, FIG. 7 illustrates a perspective view of a first side of a flow conditioner 80 comprising a disk 81 with a first side and a second side. Flow conditioner 80 comprises 1) a flange 85 on a first side; 2) a series of stepped, recessed concentric rings 90 on the first side of the disk, wherein each concentric ring comprises a plurality of holes 95 defining fluid passages from the respective ring to the second side of the disk; and 3) a recessed central hole 100 opens on the second side of the disk. FIG. 8 illustrates a perspective view of a second side of the flow conditioner of FIG. 7.

Figure 9:
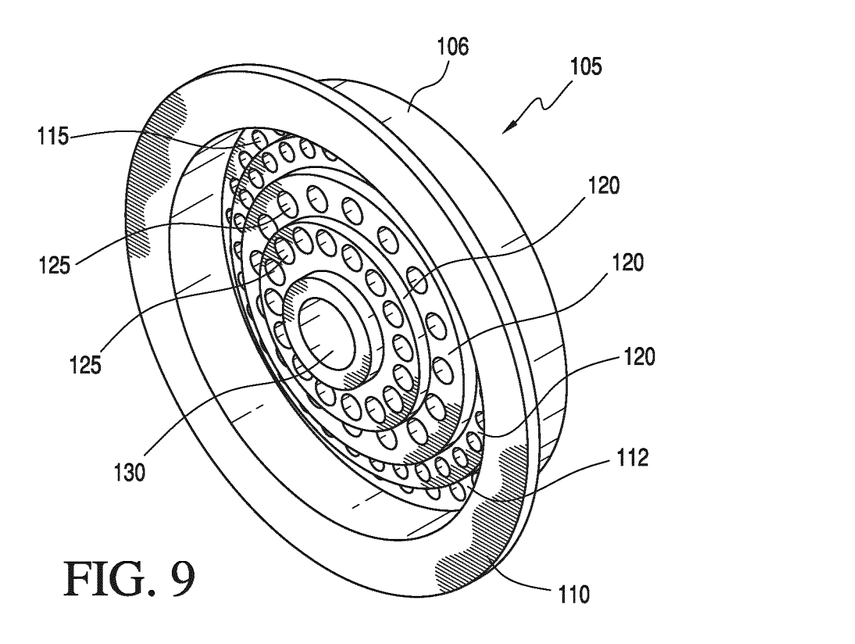
FIG. 9 illustrates a perspective view of a first side of a flow conditioner according to a fifth embodiment of the present invention.

According to a fifth embodiment, FIG. 9 illustrates a perspective view of a first side of a flow conditioner 105 comprising a disk 106 having a first side and a second side. Flow conditioner 105 comprises 1) a flange 110 on a first side of the disk; 2) an outer, first concentric ring 112 extending from a second side of the disk and comprising a plurality of holes 115 defining fluid passages to the second side of the disk, wherein said outer, first concentric ring 112 is recessed from the flange 110; 3) at least one inner concentric ring, for example, a series of stepped concentric rings 120, each ring extending upwards from the outer, first ring 112 and comprising a plurality of holes 125 defining fluid passages to the second side of the disk; and 4) a central hole 130 extending upward from the last of said series of stepped rings 120 and opening on the second side of the disk.

Figure 9A:
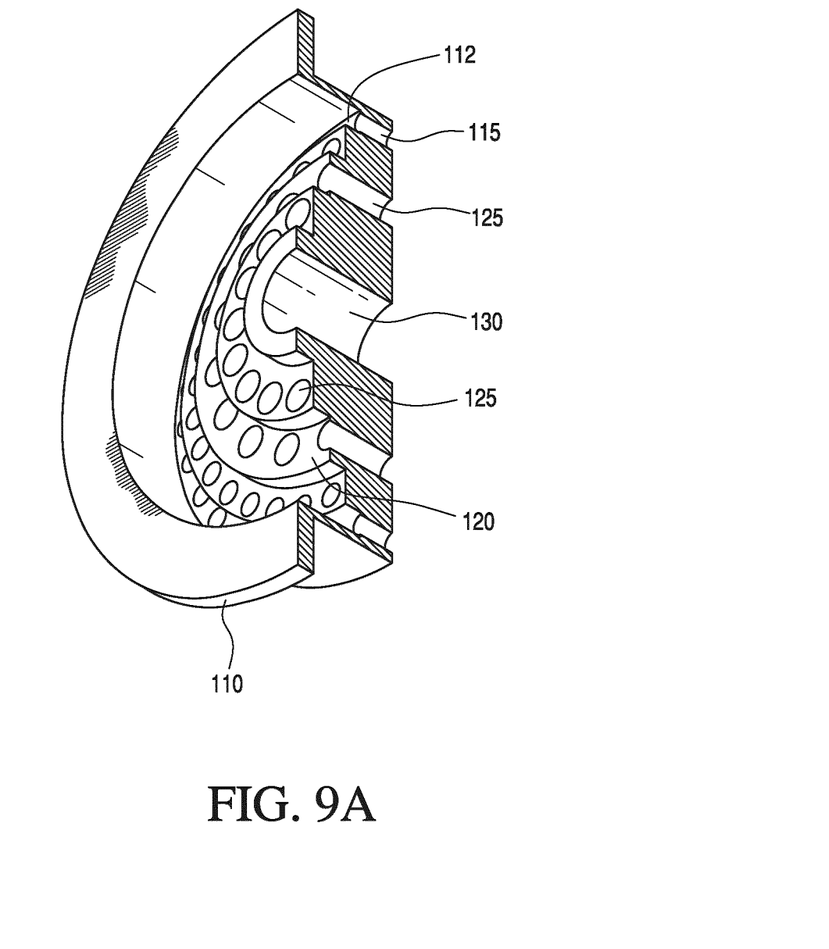
FIG. 9a is a cut-away view of the flow conditioner of FIG. 9.
Figure 10:
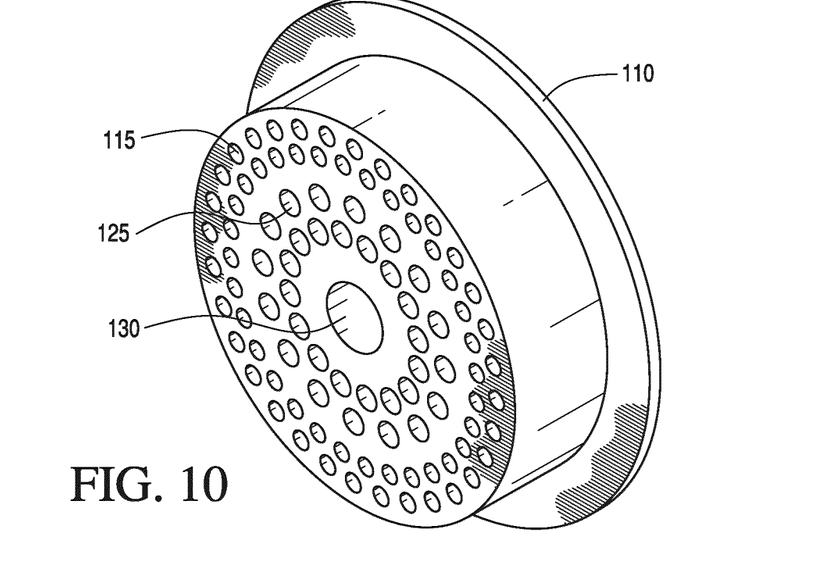
FIG. 10 illustrates a perspective view of a second side of the flow conditioner of FIG. 9.

FIG. 9a is a cut-away view of the flow conditioner of FIG. 9. The plurality of holes 115 in the outer, first concentric ring 112 and the plurality of holes 125 in the inner concentric rings 120 provide fluid passages of unequal length from the first side of the flow conditioner to the second side of the flow conditioner. FIG. 10 illustrates a perspective view of the second side of the flow conditioner of FIG. 9.

Figure 11:
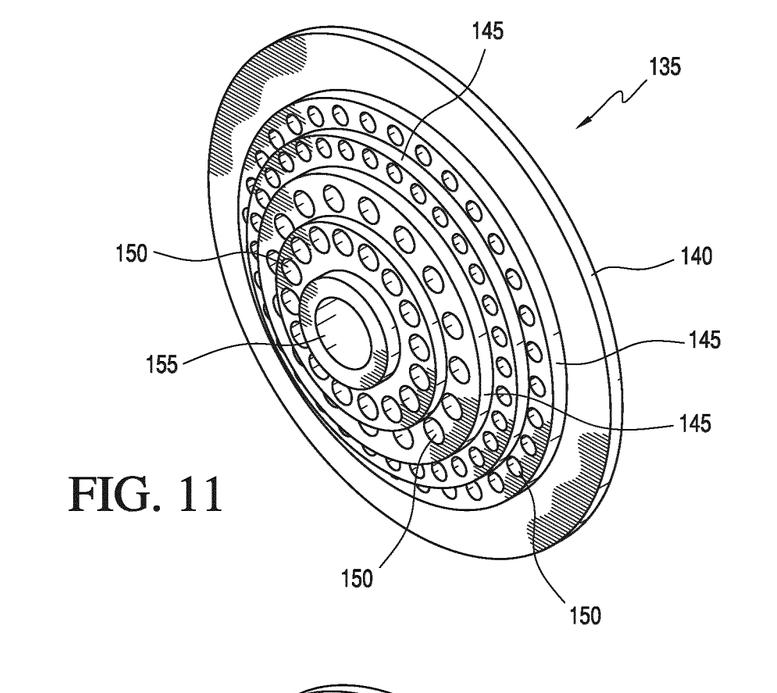
FIG. 11 illustrates a perspective view of a second side of a flow conditioner according to a sixth embodiment of the present invention.

According to a sixth embodiment, FIG. 11 illustrates a perspective view of a second side of a flow conditioner 135 comprising a disk having a first side and a second side. Flow conditioner 135 comprises 1) a flange 140 on a first side; 2) a series of stepped concentric rings 145, each concentric ring extending upwards from the first side and comprising a plurality of holes 150 defining fluid passages to the first side; and 3) a central hole 155 extending upward from the last of said series of stepped concentric rings 145 and opening on the first side.

Figure 11A:
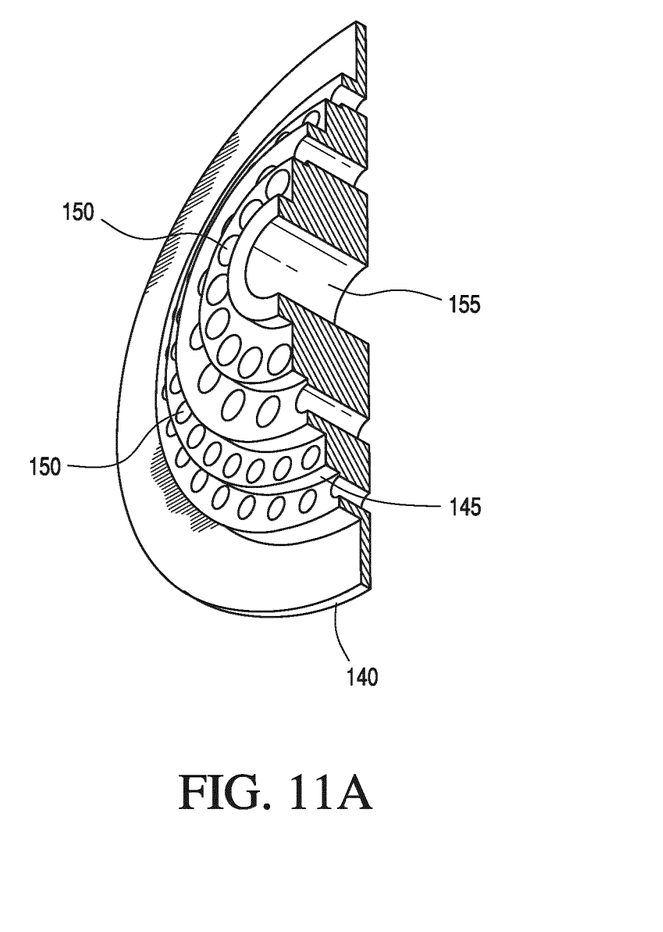
FIG. 11a is a cut-away view of the flow conditioner of FIG. 11.
Figure 12:
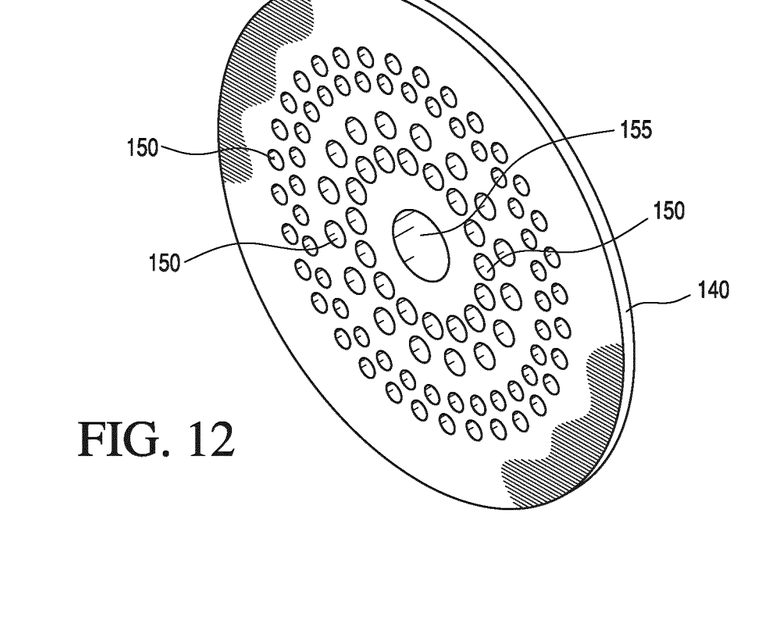
FIG. 12 illustrates a perspective view of a first side of the flow conditioner of FIG. 11.

FIG. 11a is a cut-away view of the flow conditioner of FIG. 11. The plurality of holes 150 in each of said series of stepped rings 145 provide fluid passages of unequal length from the first side of the flow conditioner to the second side of the flow conditioner. FIG. 12 illustrates a perspective view of the second side of the flow conditioner of FIG. 11.

According to the present invention, a method for designing a flow conditioner is provided. The configuration of the holes in a flow conditioner may be selected depending on the experimental or theoretical testing of the fluid dynamics of a pipe into which the flow conditioner is to be installed.

In specific embodiments, a length of the fluid passages defined by the holes may be calculated based on at least one of fluid profile distortion or fluid swirl intensity (e.g., swirl at the pipe walls). In specific embodiments, the length of a fluid passage defined by each hole (x) may be a function of the radius (r) from a center of a pipe in which the flow conditioner is to be installed. The length may be calculated by the following formula (1):

$$D = C^* \operatorname{Tan}^{-1}(VT/Vx) \quad (1)$$

Wherein D is the depth of the flow conditioner holes, VT is the tangential velocity of fluid in the pipe (i.e., the swirl vector), Vx is the axial velocity of fluid in the pipe (i.e., velocity in a longitudinal direction of the pipe) and C is a coefficient that corrects for the fluid viscosity, density, wall roughness and the swirl reduction factor. C may be experimentally determined from testing results of computational solutions. In specific embodiments, C may be determined through experimental and/or theoretical testing where flow conditioner modifications or revisions are subjected to a range of fluid applications and a set amount of upstream swirl. The reduction in swirl is measured and associated with the fluid dynamic properties: fluid viscosity, density and wall roughness, factors that influence the flow conditioner pressure drop and fluid ability to resist swirl.

Depending on the number of holes in a flow conditioner a calculation using the above formula (1) may be done at a bolt circle distance (e.g., diameter of an outer or inner ring from a center axis of the pipe from which all holes are cut) from the center of the pipe for each ring hole. Thus, more ring holes may give higher resolution of the fluid swirl, and more discrete calculations.

The following is a non-limiting example.

EXAMPLE

The Example is taken in fluid scenario with about 25 degrees of swirl in the inlet. The fluid has: a Reynolds number is 24,854,836; a Density of 36.54 kg/m$^3$; and a viscosity of $1.12 \times 10^{-5}$ Pa*S at 300K.

At a pipe inlet in which a flow conditioner is to be installed, Vx is measured as 24.083 m/s, VT is measured as 10.017 m/s at a radius of 4.728 inches (12.0 cm) from the center of the pipe having a radius of 5.969 inches (15.16 cm). This calculates to approximately 22.584 degrees of swirl. C is determined to be 10.5979. This computes to a flow conditioner thickness of 3.7595 inches (9.55 cm) to give a swirl reduction of 90%. D is the length of the holes/thickness of the plate through which the holes are drilled, which in this example is for the outer ring.

Suitable flow conditioners with which to incorporate the configuration or holes of the present invention may include, but are not limited to, CPA TBR and CPA 50E flow conditioners available from Canada Pipeline Accessories of Calgary, Alberta Canada; and the flow conditioners described in U.S. Pat. No. 5,341,848.

Figure 13:
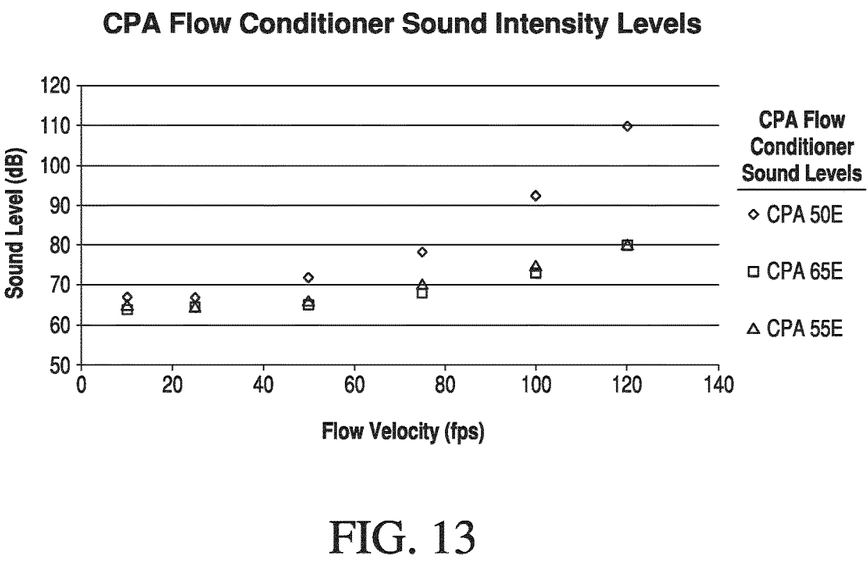
FIG. 13 is a graph showing sound level for a flow conditioners of one embodiment of the present invention and a known flow conditioner.

FIG. 13 is a graph showing sound level for a flow conditioner of FIG. 5 (CPA 55E and CPA 65E) and a known flow conditioner (CPA 50E). At a flow velocity of 120 feet/s (36.6 m/s), there is a 30 dB reduction in sound or noise level with a flow conditioner of the present invention.

In specific embodiments, the flow conditioner may be sized to pipe inside diameter D (0.85D-0.99D). In specific embodiments, the flow conditioner thickness may be about 0.05D-0.35D. In specific embodiments, an outer ring of holes may end at between 0.65D-0.97D and an inner ring of holes may be between about 0.30D to 0.65D.

Any flow conditioner according to the present invention may be coated or plated with a composition comprising nickel or a nickel-phosphorous alloy. In specific embodiments, the composition may comprise between 1% and 12% phosphorus and between 87% and 99% nickel by weight. The thickness of the coating or plating may be between about 1 and about 250 microns, for example, between about 10 and about 50 microns.

The flow conditioner according to the present invention may be utilized in existing piping without making modifications. In specific embodiments, the flow conditioner may have a flanged connection, which is frequently available in meter stations. Thus, it is very simple and extremely compatible with meter station layouts.

VI. INDUSTRIAL APPLICABILITY

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A flow conditioner, comprising:
a single disk having a first side and a second side;
a central hole that opens on a first side of the disk;
at least one inner ring comprising a concentric ring of a plurality of holes, wherein the holes define fluid passages from the at least one inner ring to the first side of said disk; and
an outer ring comprising a concentric ring of a plurality of holes, wherein the holes define fluid passages from the outer ring to the first side of said disk;
wherein 1) a diameter of the central hole is greater than the diameters of the plurality of holes of the at least one inner ring, and 2) the diameters of the plurality of holes of the at least one inner ring are greater than the diameters of the plurality of holes of the outer ring, and
wherein 1) the central hole defines a fluid passage having a length which is less than the length of the fluid passages of the plurality of holes of the at least one inner ring, and 2) the length of the fluid passages of the plurality of holes of the at least one inner ring is less than the length of the fluid passages of the outer ring, wherein the at least one inner ring is in a stepped, recessed configuration from the outer ring.

2. A flow conditioner according to claim 1, wherein the plurality of holes of the outer ring and the plurality of holes of the at least one inner ring each comprise circular holes.

3. A flow conditioner according to claim 1, wherein the central hole is recessed from said at least one inner ring.

4. A flow conditioner according to claim 1, wherein the at least one inner ring comprises two or more stepped, recessed concentric rings, each concentric ring comprising a plurality of holes.

5. A flow conditioner according to claim 1, further comprising a flange connection on the first side of said disk.

6. A flow conditioner according to claim 1, further comprising a flange connection on the second side of said disk.

7. A flow conditioner according to claim 1, further comprising a coating or plating composition comprising nickel or a nickel-phosphorous alloy.

8. A flow conditioner according to claim 1, further comprising an outer ring and at least one inner ring on both sides of the flow conditioner.

9. A method of designing a flow conditioner, comprising:
determining fluid dynamics of a pipe into which a flow conditioner is to be installed; and
calculating a configuration for a plurality of holes of the at least one inner ring and the outer ring of a flow conditioner according to claim 1.

10. A method of designing according to claim 9, wherein a length of a fluid passage defined by each hole (x) is a function of the radius (r) from a center of the pipe.

11. A method according to claim 9, wherein the length of a fluid passage is calculated by the following formula:

$$D = C^* \text{Tan}^{-1}(VT/Vx)$$

wherein D is the depth of the flow conditioner holes, VT is the tangential velocity of a fluid in the pipe, Vx is the axial velocity of the fluid in the pipe, and C is a coefficient that corrects for fluid viscosity, density, wall roughness and the swirl reduction factor.

12. A pipe assembly for flow measurement, comprising:
a fluid flow pipe;
at least one flow conditioner according to claim 1 disposed within said fluid flow pipe in an orientation substantially perpendicular to an axis of said fluid flow pipe.

13. A pipe assembly according to claim 12, wherein the outer ring and at least one inner ring are on an upstream side of the at least one flow conditioner.

14. A pipe assembly according to claim 12, wherein the outer ring and at least one inner ring are on a downstream side of the at least one flow conditioner.

15. A pipe assembly according to claim 12, wherein an outer ring and at least one inner ring are on both sides of the flow conditioner.

16. A fluid flow measurement system, comprising:
a fluid flow pipe;
at least one flow conditioner according to claim 1 disposed within said fluid flow pipe in an orientation substantially perpendicular to an axis of said fluid flow pipe; and
a flow meter downstream of the flow conditioner.

17. A flow conditioner according to claim 1, wherein said stepped, recessed configuration is from a first planar surface to a second planar surface.

18. A flow conditioner according to claim 1, wherein said stepped, recessed configuration is on the first side of said disk, the second side of said disk being flat.

19. A flow conditioner, comprising:
- a single disk with a central hole, said central hole having a first diameter and defining a first fluid passage;
- at least one inner ring comprising a concentric ring of a first plurality of holes, said first plurality of holes having a second diameter less than the first diameter and defining second fluid passages;
- an outer ring comprising a concentric ring of a second plurality of holes, said second plurality of holes having a third diameter less that the second diameter and defining third fluid passages,
- wherein the at least one inner ring is in a stepped, recessed configuration from the outer ring, and
- wherein the greater the diameters of the respective holes, the shorter the length of the respective fluid passages.

20. A flow conditioner according to claim 19, wherein said stepped, recessed configuration is on a first side of said disk, a second side of said disk being flat.

* * * * *